(12) United States Patent
Kawasaki et al.

(10) Patent No.: US 8,491,236 B2
(45) Date of Patent: Jul. 23, 2013

(54) TOOTH PLANE MACHINING METHOD

(75) Inventors: Toshifumi Kawasaki, Toyota (JP);
Masaki Kato, Toyoake (JP); Toru Ikegawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/502,539

(22) PCT Filed: Oct. 12, 2010

(86) PCT No.: PCT/JP2010/067848
§ 371 (c)(1),
(2), (4) Date: Apr. 18, 2012

(87) PCT Pub. No.: WO2011/048975
PCT Pub. Date: Apr. 28, 2011

(65) Prior Publication Data
US 2012/0207558 A1 Aug. 16, 2012

(30) Foreign Application Priority Data

Oct. 21, 2009 (JP) ................. 2009-242395

(51) Int. Cl.
*B23F 17/00* (2006.01)
*B23F 1/06* (2006.01)

(52) U.S. Cl.
USPC .................. 409/51; 409/52; 409/61

(58) Field of Classification Search
USPC ........ 409/38, 51, 52, 56–57, 61, 50, 131–132
See application file for complete search history.

(56) References Cited

U.S. PATENT DOCUMENTS

| 2,126,990 A | * | 8/1938 | Graves | 409/51 |
| 2,737,855 A | * | 3/1956 | Wenz | 409/52 |
| 2003/0235479 A1 | | 12/2003 | Chihara et al. | |

FOREIGN PATENT DOCUMENTS

| JP | 50-9896 | 1/1975 |
| JP | 60-9615 | 1/1985 |
| JP | 2001-269816 | 10/2001 |
| JP | 2004-74394 | 3/2004 |
| JP | 2004-130434 | 4/2004 |
| JP | 2005-105316 | 4/2005 |
| JP | 3876101 | 11/2006 |
| JP | 4189878 | 9/2008 |
| WO | WO 2008/133517 | 11/2008 |

OTHER PUBLICATIONS

International Search Report in International Application No. PCT/JP2010/067848; Mailing Date: Dec. 28, 2010.
Written Opinion of ISA PCT/JP2010/067848 dated Dec. 28, 2010.

(Continued)

*Primary Examiner* — Erica E Cadugan
(74) *Attorney, Agent, or Firm* — Finnegan, Henderson, Farabow, Garrett & Dunner, LLP

(57) ABSTRACT

Provided is a method for machining a tooth plane that is formed on a circumferential surface of a cylindrical toothed member and that extends along a center axis of the toothed member. The method includes: cutting the tooth plane by a peripheral cutting edge of an end mill while keeping a rotation axis of the end mill at a predetermined steady orientation and moving the end mill parallel to the center axis of the toothed member; rotating the toothed member by a predetermined angle around the center axis of the toothed member; and cutting the tooth plane by the peripheral cutting edge of the end mill while keeping the rotation axis of the end mill at the steady orientation and moving the end mill parallel to the center axis of the toothed member.

2 Claims, 6 Drawing Sheets

OTHER PUBLICATIONS

Notification of Reasons for Rejection for JP Appl. No. 2009-242395 dated Apr. 17, 2012.

International Preliminary Report on Patentability for PCT/JP2010/067848 dated May 24, 2012.

* cited by examiner

TOOTH PLANE MACHINING METHOD

CROSS-REFERENCE TO RELATED APPLICATIONS

This application is a national phase application of International Application No. PCT/JP2010/067848, filed Oct. 12, 2010, and claims the priority of Japanese Application No. 2009-242395, filed Oct. 21, 2009, the contents of both of which are incorporated herein by reference.

TECHNICAL FIELD

The present invention relates to a technology of machining a tooth plane in a toothed member. More particularly, the present invention relates to a method for machining a tooth plane that is formed on a circumferential surface of a cylindrical toothed member and that extends along a center axis of the toothed member. In the present description, "toothed member" denotes a member having the tooth plane. The "toothed member" is typically a gear, but is not limited to a gear, and may be, for instance, an outer punch (one type of die) that is used for forming a gear.

DESCRIPTION OF RELATED ART

A toothed member has a cylindrical shape. A tooth plane is formed on an circumferential surface of the toothed member. The tooth plane extends along a center axis of the toothed member, or extends helically about the center axis. Electrical discharge machining has been conventionally used as a method for machining toothed members. The electrical discharge machining allows machining a high-hardness workpiece as long as the workpiece has conductivity. Machining with good precision is realized therefore by resorting to the electrical discharge machining to machine the toothed member that is formed out of high-hardness metal. However, the electrical discharge machining has drawbacks in terms of, for instance, operational safety and environmental measures for the treatment of machining fluid. The electrical discharge machining is thus currently giving way to cutting. As an example of the above, Japanese Patent Application Publication No. 2004-74394 (referred to as a patent document 1, hereinafter) discloses a technique of cutting a bevel-gear forging die using an end mill. In the end mill of the patent document 1, there are formed peripheral cutting edges, which are formed on a circumferential surface, end cutting edges that are formed at a leading end face, and R edges that connect smoothly the peripheral cutting edges with the end cutting edges. The technology of the patent document 1 allows machining a bevel-gear forging die, with good precision, by using such a plurality of edges.

BRIEF SUMMARY OF INVENTION

Technical Problem

Ordinarily, an NC machine (machining machine in which tool motion is controlled numerically by a computer) is used in cutting. If a tooth plane of a toothed member is cut by an end mill, there are decided orientations, movement directions and movement amounts of the toothed member and the end mill for each cutting on the basis of a design shape of the tooth plane, and NC data is generated thereupon on the basis of the decision. The computer operates the end mill and the toothed member on the basis of the generated NC data, to machine the tooth plane to a design shape.

In the technology of the patent document 1, the tooth plane is machined while moving the end mill relatively, in three dimensions, with respect to the toothed member. As a result, the orientation and movement direction of the end mill must be changed in a complex manner. Generation of the NC data becomes thus complex. To achieve in cutting the same precision as in electrical discharge machining, as the end mill wears down, correction to the NC data with consideration to the wear is necessary. Depending on the circumstance, the NC data must be corrected each time that one tooth is machined. It is likewise cumbersome to correct frequently the NC data for moving the end mill in three dimensions.

The technology of the patent document 1 is very useful, but issues remain that call for improvement in terms of load to generate and correct the NC data. The present invention solves these issues. It is an object of the present invention to provide a technology for machining a tooth plane of a toothed member with good efficiency.

Solution to Problem

A novel method, disclosed in the present description, for machining a tooth plane is a method for machining a tooth plane formed on a circumferential surface of a toothed member having cylindrical shape and extending along a center axis of the toothed member. The method for machining the tooth plane comprises three steps below.

(1) Cutting the tooth plane by a peripheral cutting edge of an end mill while keeping a rotation axis of the end mill at a predetermined steady orientation and moving the end mill parallel to the center axis of the toothed member.

(2) Rotating the toothed member by a predetermined angle around the center axis of the toothed member.

(3) Cutting the tooth plane by the peripheral cutting edge of the end mill while keeping the rotation axis of the end mill at the steady orientation and moving the end mill parallel to the center axis of the toothed member.

In the method for machining the tooth plane, the orientation of the rotation axis of the end mill is kept steady throughout a plurality of cuttings. Therefore, a movement trajectory (including the orientation) of the end mill during the cutting is very simple, and generation of NC data is simplified. In this method for machining the tooth plane, moreover, the tooth plane can be cut using only the peripheral cutting edge among the plurality of edges (peripheral cutting edge and end cutting edge) of the end mill. As a result, the correction to the trajectory of the end mill with consideration to its wear can be performed simply by adjusting a position of the end mill in a direction that is perpendicular to the peripheral cutting edge of the end mill. The above method allows simplifying the correction of the NC data of the end mill trajectory with consideration to its wear.

Preferably, the novel method for machining the tooth plane disclosed in the present description may further comprise approximating a curved line by a broken line. The curved line may be a design shape of the tooth plane in a cross-sectional surface intersecting with the center axis of the toothed member. In the approximating by the broken line, the approximating may be performed so that a maximum distance among distances between respective straight lines included in the broken line and the curved line comes to be less than a machining tolerance of the tooth plane. In the rotating, the toothed member is rotated so that one of the straight lines comes to be parallel to the rotation axis of the end mill. The cross-sectional surface that intersects the center axis of the toothed member will be referred to hereafter as a transverse cross-sectional surface.

In a broad view, the peripheral cutting edge of the end mill is a straight line. Therefore, cutting by using only the peripheral cutting edge, while moving the rotation axis of the end mill in a parallel fashion, yields a flat tooth plane after the machining. In many instances, however, the design shape required for the tooth plane is a curved surface. In consequence, the design shape of the transverse cross-sectional surface is a curved line, for instance, an involute curve or the like. In order to machine the curved tooth plane using only the peripheral cutting edge while causing the rotation axis of the end mill to move in the parallel fashion, a step may be added in which the curved surface is approximated to a plurality of planes. As a result of such approximating, tooth plane can be machined to the shape within the given machining tolerance range for the curved surface, which is the design shape of the tooth planes, also in a simple method that involves cutting the tooth plane using the peripheral cutting edge while causing the rotation axis of the end mill to move in a parallel fashion.
Advantageous Effects of Invention The present invention allows machining a tooth plane of a toothed member with good efficiency.

DESCRIPTION OF EMBODIMENTS

A summary is given first on the main features of the embodiments explained below.
(Feature 1) During cutting a tooth plane of a toothed member using a peripheral cutting edge of an end mill, the end mill is moved in a direction perpendicular to a rotation axis thereof, and the peripheral cutting edge of the end mill is placed in contact with the tooth plane of the toothed member.
(Feature 2) Tooth planes are repeatedly cut while moving the end mill on a same straight line trajectory. That is, tooth planes are repeatedly cut while causing the end mill to reciprocate on a same straight line trajectory.
Embodiment 1

Figure 1:
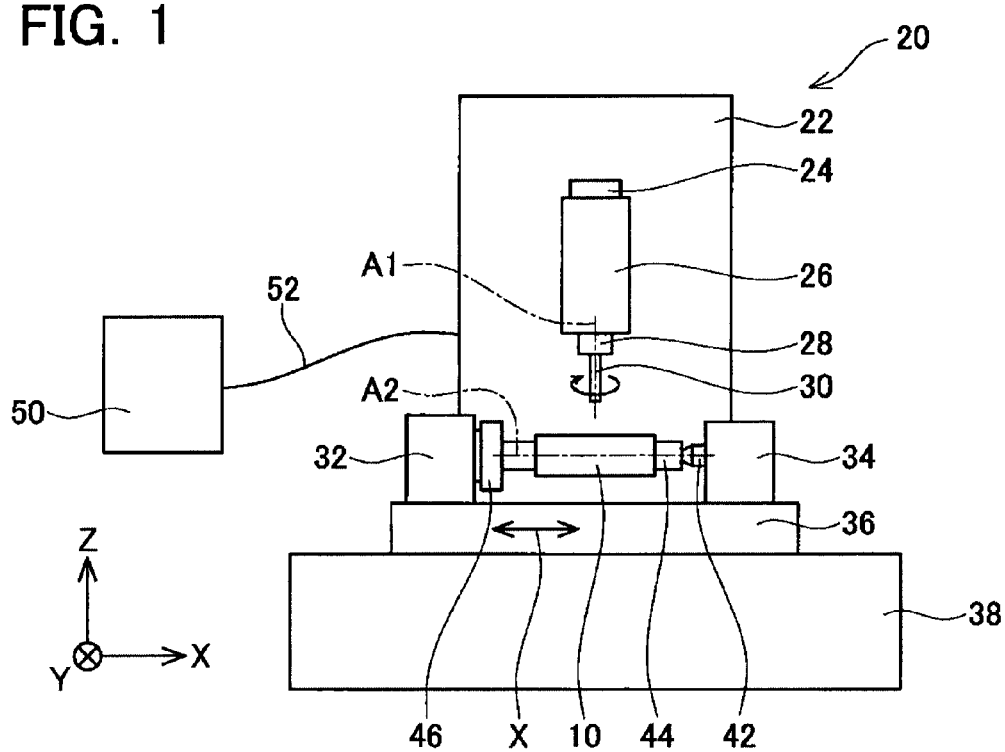
FIG. 1 is a front-view schematic diagram of an NC machining machine 20.
Figure 2:
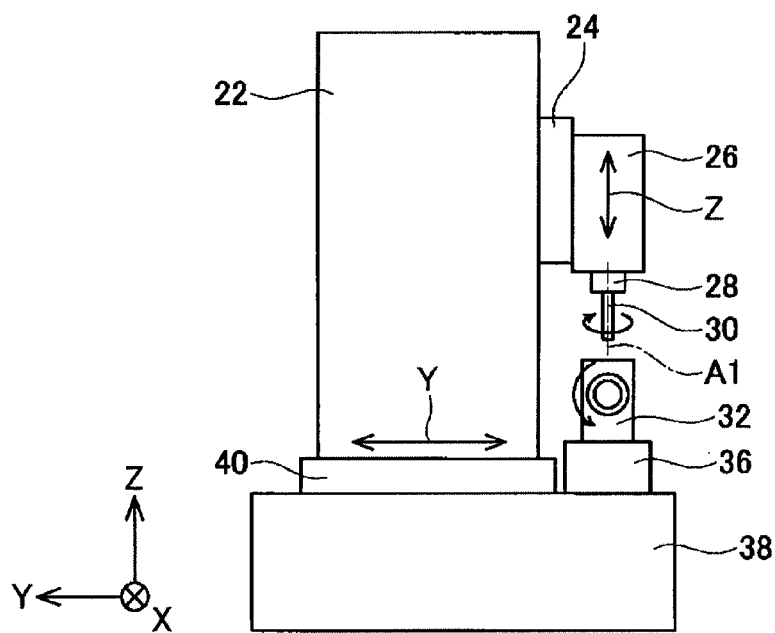
FIG. 2 is a side-view schematic diagram of the NC machining machine 20.

An NC machining machine 20 will be explained, with reference to FIG. 1 and FIG. 2, before an explanation of the method for machining a tooth plane of the present embodiment. For purposes of explanation, a Cartesian coordinate system XYZ is defined as in FIG. 1 and FIG. 2. The NC machining machine 20 is a machine in which a tooth planes of an outer punch 10 are cut by a radius end mill 30 (hereafter, end mill 30). The outer punch 10 is a component in a die for gear forming. The outer punch 10 is used for burning of spur gears for hub clutches that are used, for instance, in transmissions. The outer punch 10 corresponds to a so-called "core" for forming internal teeth on an inner face of a ring-like spur gear. The outer punch 10 has a cylindrical shape. A plurality of teeth, extending along a cylinder axis, is formed on a circumferential surface of the outer punch 10. That is, the surface of each tooth formed on the circumferential surface of the outer punch 10 corresponds to a tooth plane.

The end mill 30 comprises cutting edges (peripheral cutting edges) that extend helically about a rotation axis of the end mill 30. In addition, the end mill 30 has, at a tool leading end thereof, cutting edges (end cutting edges) that extend, from the rotation axis, outwards in a radial direction and cutting edges (R edges) that contiguously connects the peripheral cutting edges and the end cutting edges. In the NC machining machine 20, the tooth planes of the outer punch 10 are cut using only the peripheral cutting edges of the end mill 30. The end cutting edges and the R edges are not used. In a broad view, the peripheral cutting edges of the end mill 30 form straight line shapes that are parallel to the rotation axis. That is, a movement locus of each peripheral cutting edge traces a cylindrical surface upon rotation of the end mill 30 about the rotation axis. At a cross-sectional surface that includes the rotation axis, this cylindrical surface is a straight line that is parallel to the rotation axis.

The NC machining machine 20 comprises, as main components, a column 22, a first movement mechanism 24, a slider 26, a first rotation mechanism 28, the end mill 30, a second rotation mechanism 32, a tailstock 34, a second movement mechanism 36, a stage 38, a third movement mechanism 40, a centering member 42, a fixing jig 44, a chuck 46 and a computer 50. The first movement mechanism 24, the third movement mechanism 40 and the first rotation mechanism 28 are mechanisms for causing the end mill 30, which is a machining tool, to move and rotate. The second movement mechanism and the second rotation mechanism are mechanisms for causing the outer punch 10, which is a workpiece, to move and rotate.

The third movement mechanism 40 is disposed on the stage 38. The third movement mechanism 40 is an actuator for causing the column 22 to move along a Y-axis that extends in a horizontal plane. The column 22 moves along the Y-axis, with respect to the stage 38, upon driving of the third movement mechanism 40. The first movement mechanism 24 is disposed on the column 22. The first movement mechanism 24 is an actuator for causing the slider 26 to move up and down along a Z-axis that extends in a vertical direction. The slider 26 moves along the Z-axis, with respect to the column 22, upon driving of the first movement mechanism 24. The slider 26 comprises the first rotation mechanism 28. The end mill 30 is rotatably supported on the first rotation mechanism 28. The end mill 30 is supported in such a manner that a rotation axis A1 thereof extends along the vertical direction. That is, the rotation axis A1 is set to be parallel to the Z-axis. The end mill 30 rotates about the rotation axis A1 thereof upon driving of the first rotation mechanism 28.

The second movement mechanism 36 is disposed on the stage 38. The second movement mechanism 36 is an actuator for causing the second rotation mechanism 32 and the tailstock 34 to move along an X-axis that extends in the horizontal plane. The second rotation mechanism 32 and the tailstock 34 move along the X-axis, with respect to the stage 38, upon driving of the second movement mechanism 36. The second rotation mechanism 32 comprises the chuck 46. The chuck 46 is rotatably supported on the second rotation mechanism 32. One end of the fixing jig 44 is supported on the chuck 46. That is, the fixing jig 44 is rotatably supported by the second rotation mechanism 32. The fixing jig 44 is supported in such a manner that a center axis A2 thereof is parallel to the X-axis. The fixing jig 44 rotates about the center axis A2 thereof when the second rotation mechanism 32 causes the chuck 46 to rotate. The tailstock 34 comprises the centering member 42. The centering member 42 is disposed in such a way so as to be coaxial with the fixing jig 44 that is supported on the chuck 46. When the fixing jig 44 is supported on the chuck 46, the centering member 42 supports the other end of the fixing jig 44.

The NC machining machine 20 comprises the computer 50. The computer 50 is connected to each of the movement mechanisms 24, 36, 40 and each of the rotation mechanisms 28, 32 by way of a cable 52. The computer 50 has received input of NC data that is based on a design shape of the tooth planes of the outer punch 10. The NC data is data for driving (moving) the respective movement mechanisms and respective rotation mechanisms during cutting of the tooth planes of the outer punch 10 with the end mill 30. The NC data includes data such as, for instance, an operation trajectory (movement path and movement speed) of each movement mechanism, and revolutions of each rotation mechanism. That is, the NC data defines a movement path of the end mill 30. The movement path of the end mill 30 includes a translation path and rotation angles around two axes that intersect a rotation axis of the end mill. The computer 50 controls the movement mechanisms 24, 36, 40 and the rotation mechanisms 28, 32 on the basis of the inputted NC data. The tooth planes of the outer punch 10 are cut as a result by the end mill 30 of the NC machining machine 20.

The operation of the NC machining machine 20 is explained next. FIG. 1 and FIG. 2 illustrate the NC machining machine 20 in a state where the first movement mechanism 24 is stopped at an upper limit position. The outer punch 10 is fixed to the cylindrical fixing jig 44, in a state where the fixing jig 44 is inserted into a through-hole (central hole) of the outer punch 10. The outer punch 10 is fixed to the fixing jig 44 in such a manner that the center axis A2 of the fixing jig 44 coincides with a center axis of the outer punch 10. The fixing jig 44, to which the outer punch 10 is fixed, is in turn fixed to the NC machining machine 20, in a state where the first movement mechanism 24 is stopped at the upper limit position, as illustrated in FIG. 1 and FIG. 2. The outer punch 10 rotates about the center axis A2 when the second rotation mechanism 32 causes the fixing jig 44 to rotate.

Figure 3:
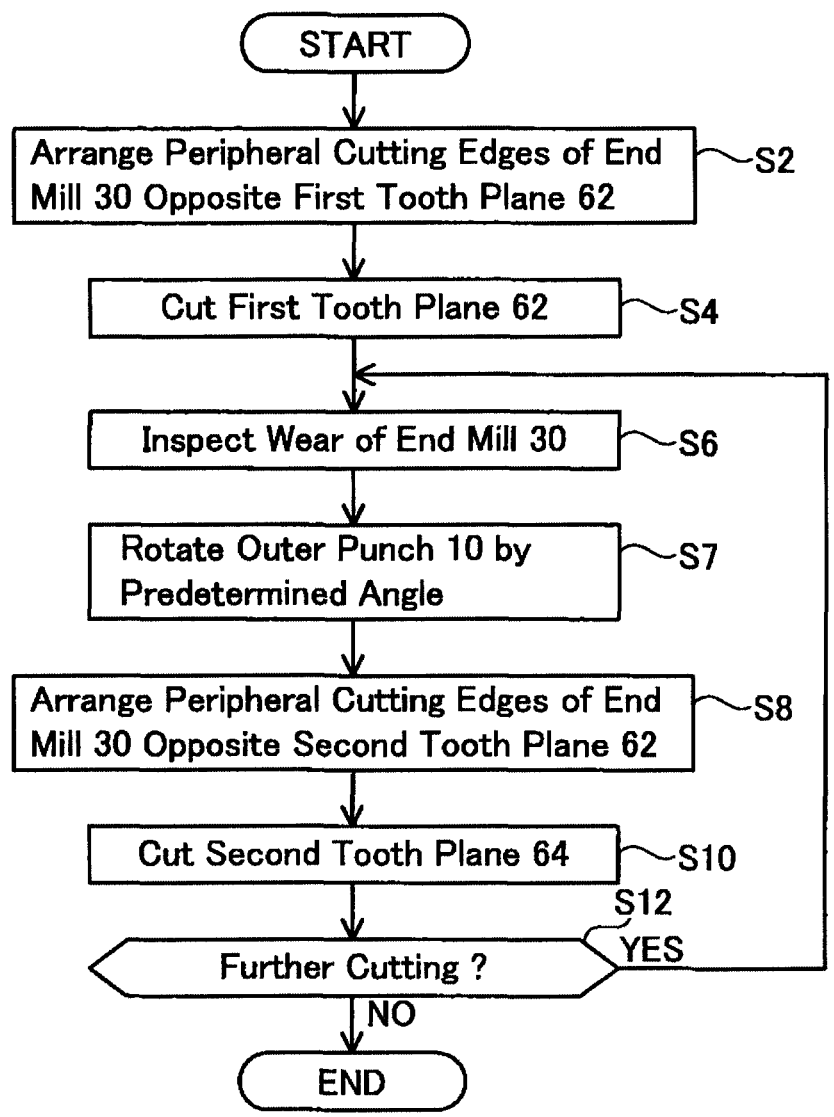
FIG. 3 is a flowchart of cutting of an outer punch 10.
Figure 4:
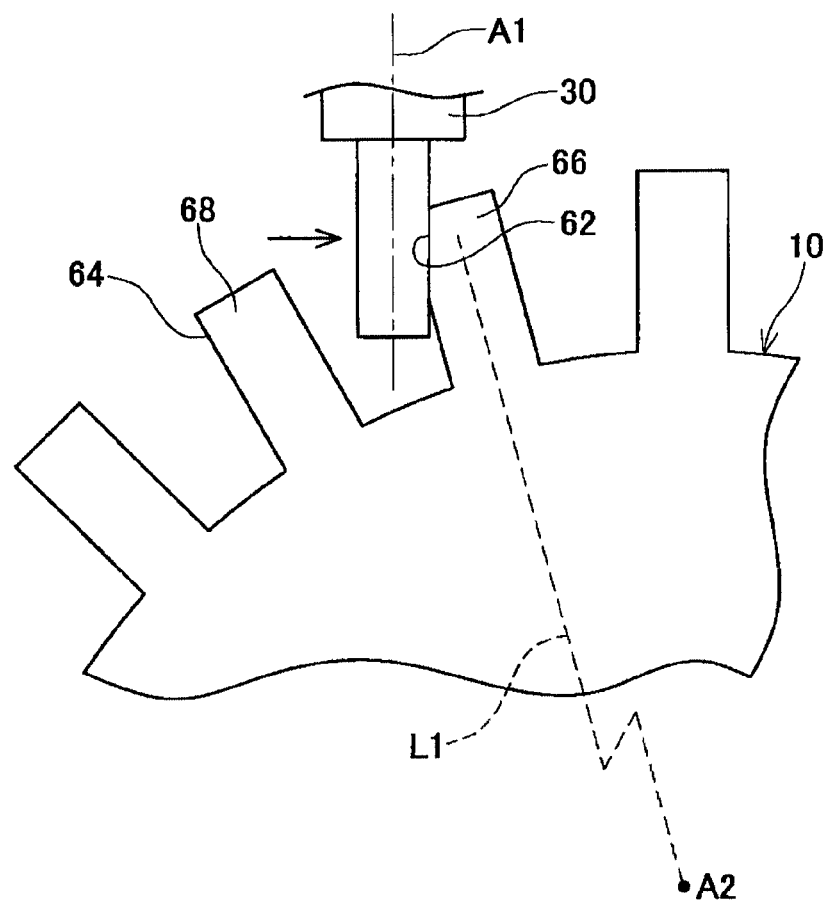
FIG. 4 is a diagram for explaining cutting step in Embodiment 1.
Figure 5:
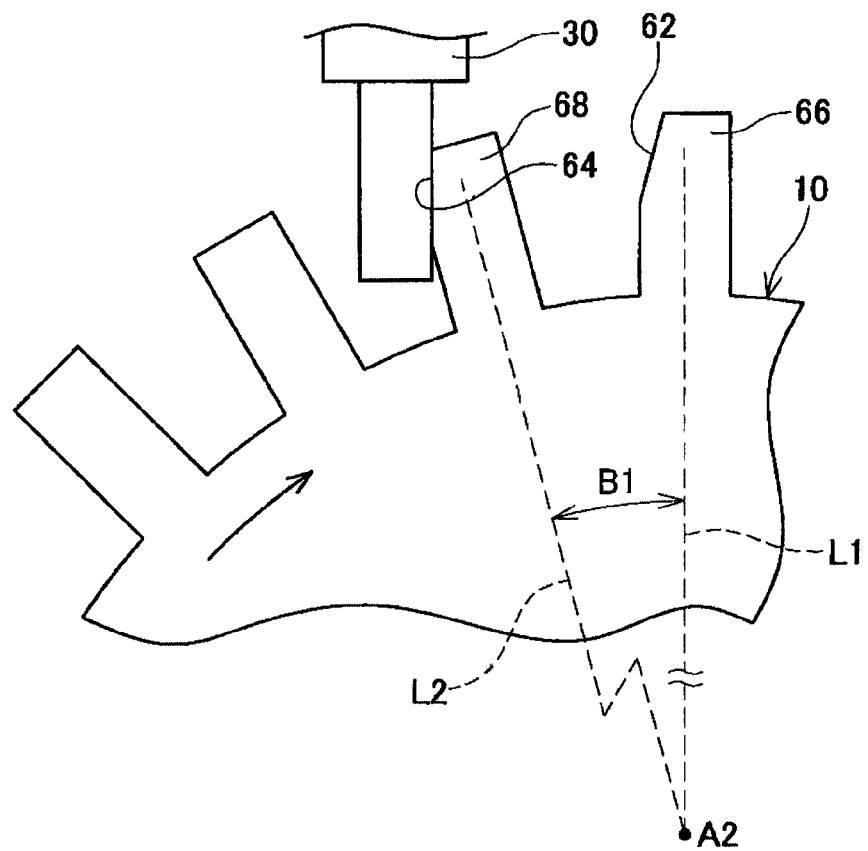
FIG. 5 is a diagram for explaining cutting step in the Embodiment 1.

FIG. 3 is a flowchart illustrating a flow of process performed by the computer 50. The process performed by the computer 50 will be explained below with reference to FIG. 3. FIG. 4 and FIG. 5, which illustrate the positional relationship between the outer punch 10 and the end mill 30 during the cutting, should be referred to in conjunction with FIG. 3.

Firstly, the computer 50 drives the movement mechanisms 24, 36, 40 and the second rotation mechanism 32 on the basis of NC data, and the end mill 30 is disposed at a position such that the peripheral cutting edges of the end mill 30 oppose a first tooth plane 62 of a tooth 66 of the outer punch 10 (S2). Herein, the term "first tooth plane" denotes a surface of the tooth 66. The denomination "first tooth plane" is given, for convenience, in order to distinguish from among a plurality of tooth planes. A surface of a tooth 68 adjacent to the tooth 66 will be referred to hereafter as a second tooth plane 64. The second rotation mechanism 32 adjusts the angle of the outer punch 10 in such a manner that the rotation axis A1 of the end mill 30 becomes parallel to a design plane of the first tooth plane 62. In the present embodiment, the rotation axis A1 of the end mill 30 is fixed to the vertical direction. An angle of the end mill 30 is set forth beforehand in the NC data.

Next, the computer 50 causes the first tooth plane 62 to be cut with the peripheral cutting edges of the end mill 30 (S4). Specifically, the computer 50 drives the first rotation mechanism 28, and causes the end mill 30 to rotate continuously. The computer 50 drives also the third movement mechanism 40 and, moves the end mill 30 in a direction (Y-axis direction) perpendicular to the rotation axis A1 as indicated by an arrow in FIG. 4, so that the peripheral cutting edges of the end mill 30 are brought into contact with the first tooth plane 62. The first tooth plane 62 is cut as a result. The third movement mechanism 40 moves the end mill 30 to a position at which the circumferential surface of the end mill 30 (i.e. the surface traced by the movement locus of the peripheral cutting edges) comes into contact with the design plane of the first tooth plane 62, and the position of the end mill 30 in the Y-axis direction is fixed at that position. Next, the computer 50 drives also the second movement mechanism 36, and moves the outer punch 10 in the direction of the center axis A2 thereof. The first tooth plane 62 is cut as a result, by the end mill 30, along the X-axis direction. Accordingly, the first tooth plane 62 is shaped to the design plane over a wide range in the X-axis direction. In the movement of the end mill 30 thus far, the rotation axis A1 of the end mill 30 is maintained in a same direction. That is, an orientation of the rotation axis A1 with respect to the stage 38 does not change.

Next, the computer 50 inspects a degree of wear of the peripheral cutting edges of the end mill 30 (S6). The computer 50 measures, by way of an inspection device (not shown) a width of the peripheral cutting edge in a direction perpendicular to the rotation axis A1 of the end mill 30. The computer 50 acquires a measured value, and compares the measured value with the width, inputted beforehand, of the end mill 30 before beginning the cutting. The computer 50 corrects the NC data if the currently measured value is smaller, by a specified value or more, than a measured value that had been inputted beforehand. In the present embodiment, the computer 50 corrects a travel distance in the NC data, over which the end mill 30 is moved in the Y-axis direction by the third movement mechanism 40 during the cutting, to a value greater than a value set beforehand. In the present embodiment, it is sufficient to correct the travel distance over which the third movement mechanism 40 moves the end mill 30 during the cutting. This enables easier NC data correction. The specified value in the comparison of the value measured by the inspection device is determined, for instance, on the basis of a minimum travel distance of the third movement mechanism 40.

Next, the computer 50 causes the end mill 30 to move up to the upper limit position by the first movement mechanism 24. Thereafter, the outer punch 10 is caused to rotate (S7), by an angle B1, by the second rotation mechanism 32, as indicated by an arrow in FIG. 5. This angle B1 is explained next. In FIG. 4 and FIG. 5, a dashed line L1 denotes a line extending along the radial direction from the center axis A2 of the outer punch 10 to the tooth 66. A dashed line L2 denotes a line extending along the radial direction from the center axis A2 to the tooth 68. The angle B1 is an angle formed between the dashed lines L1 and L2. The angle B1 corresponds to a pitch angle between adjacent teeth. After the cutting of the first tooth plane 62, the computer 50 causes the outer punch 10 to rotate by the angle B1 that corresponds to the pitch angle between teeth.

The computer 50 drives next the movement mechanisms 24, 36, 40, so that the end mill 30 becomes disposed at a position at which the peripheral cutting edges of the end mill 30 oppose the second tooth plane 64 (S8). Next, the third movement mechanism 40 moves the end mill 30 in the Y-axis direction, to bring thereby the peripheral cutting edges of the end mill 30 into contact with the second tooth plane 64. The second tooth plane 64 is cut as a result. The third movement mechanism 40 moves the end mill 30 to a position at which a circumferential surface of the end mill 30 comes into contact with a design plane of the second tooth plane 64, and then the position of the end mill 30 in the Y-axis direction is fixed at that position. Next, the computer 50 drives the second movement mechanism 36, and moves the outer punch 10 in the direction of the center axis A2 thereof. As a result, the second tooth plane 64 is cut, by the end mill 30, along the X-axis direction (step S10). Accordingly, the second tooth plane 64 is shaped to the design plane over a wide range in the X-axis direction. In step S10, the orientation of the end mill 30 (the orientation of the rotation axis A2) during cutting of the second tooth plane 64 is identical to the orientation of the end mill 30 during the cutting of the first tooth plane 62 in step S4. That is, the computer 50 cuts the second tooth plane 64 by moving the end mill 30 parallelly to the center axis A2 of the outer punch 10 while maintaining the orientation of the end mill 30 during a current cutting (step S10) identical to the orientation of the end mill 30 during a previous cutting (step S4).

When cutting the second tooth plane 64, the second tooth plane 64 is cut on the basis of the NC data corrected in step S14. As a result, this allows preventing insufficient cutting of the second tooth plane 64 on account of the wear of the peripheral cutting edges. The second tooth plane 64 can be cut thus with good precision. Thereafter, step S6 through step S10 are repeated if the cutting is to be further repeated (YES in S12), i.e. if a tooth plane other than the first tooth plane 62 and the second tooth plane 64 is to be cut. Upon repetition of step S10, the orientation of the center axis A2 of the end mill 30 is kept identical to the orientation of the end mill 30 at a time of a previous cutting.

In the technique of Embodiment 1, as described above, the outer punch 10 is repeatedly cut by the end mill 30. In each cutting, a tooth plane is cut only by the peripheral cutting edges of the end mill 30. Therefore, the amount by which the tooth plane is cut in each cutting (thickness of a cut portion) can be regulated on the basis of the distance (travel distance in a direction denoted by an arrow in FIG. 4) by which the end mill 30 is moved towards the tooth plane in a direction (Y-axis direction) that is perpendicular to the rotation axis A1. In each cutting, the orientation of the rotation axis of the end mill 30 is kept constant (vertical direction). In each cutting, as a result, the direction along which the third movement mechanism 40 moves the end mill 30 is the direction perpendicular to the rotation axis A1 of the end mill 30 at all times. In case of wear of the peripheral cutting edges, therefore, machining precision can be maintained through correction of only the travel distance of the third movement mechanism 40. The correction of the NC data is made easier as a result.

Embodiment 2

A technique for machining a gear 100 of Embodiment 2 will be explained next. A design shape of the tooth planes of the gear 100 is a curve line in a cross-sectional surface that intersects a center axis of the gear 100. The gear 100 is a spur gear that is shaped overall as a cylinder having a plurality of teeth formed on a circumferential surface of the cylinder. The NC machining machine 20 explained in the Embodiment 1 is also used for machining the teeth of the gear 100. A solid line in FIG. 6 denotes a cross-sectional surface that intersects a center axis of the gear 100, and represents a design shape of a tooth 72 of the gear 100 in that cross-sectional surface. As designed, the tooth 72 has a curved tooth plane 74. In a broad view, however, the peripheral cutting edges of the end mill 30 are straight lines. Therefore, cutting by using only the peripheral cutting edges while moving the end mill 30 translationally results in a flat tooth plane after machining. In the present embodiment, the curved line, which is the design shape of the tooth plane 74, is approximated to a broken line prior to machining. In the present embodiment, the broken line is calculated in such a manner that a maximum distance D between the curved line and each approximation straight line (each straight line in the broken line to which the curved line is approximated) is no greater than a machining tolerance of the tooth plane. It is further assumed that a length L of each approximation straight line is no greater than an edge length of the end mill 30. In the present embodiment, the curved line of the tooth plane 74 is approximated to two straight lines 75a and 76a.

Figure 6:
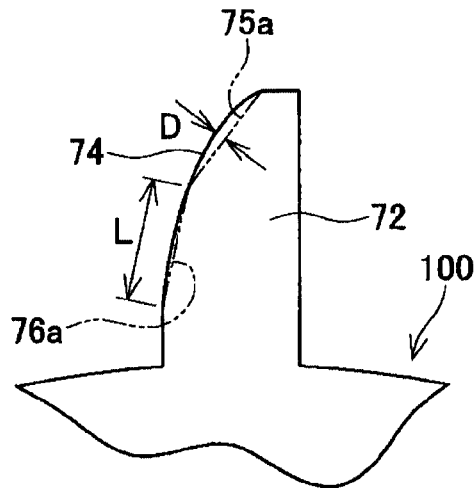
FIG. 6 is a diagram for explaining broken line approximation of a tooth plane.
Figure 7:
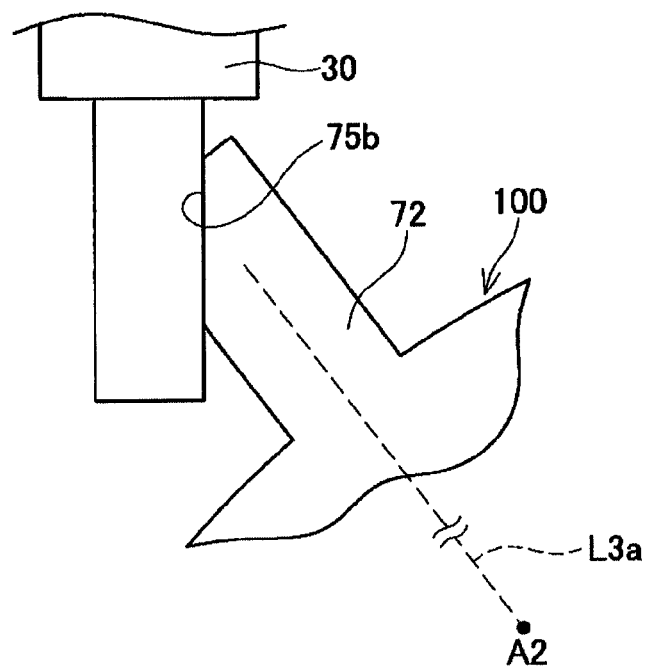
FIG. 7 is a diagram for explaining cutting step in Embodiment 2.
Figure 8:
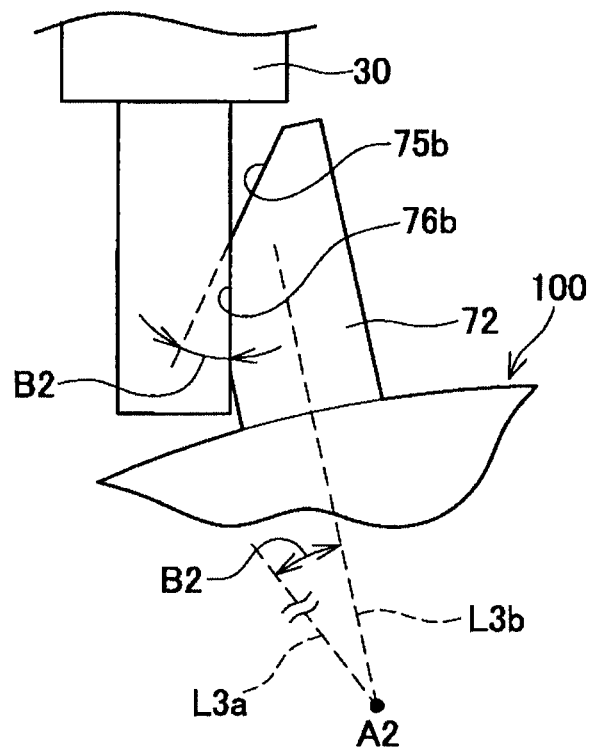
FIG. 8 is a diagram for explaining cutting step in the Embodiment 2.

A process of cutting the tooth plane over multiple stages based on the broken line approximation explained in FIG. 6 will be explained next with reference to FIG. 7 and FIG. 8. An overall cutting process is identical to the machining in the flowchart illustrated in FIG. 3. The only difference concerns the rotation angle in step S7. The explanation relating to wear is identical to that of Embodiment 1, and will be omitted.

Firstly, the computer 50 drives the movement mechanisms 24, 36, 40 and the second rotation mechanism 32, and the end mill 30 is disposed at a position such that the peripheral cutting edges of the end mill 30 oppose the tooth 72 of the outer punch 10 (S2). At this time, the angle of the outer punch 10 is adjusted by the second rotation mechanism 32 in such a manner that a rotation axis A1 of the end mill 30 becomes parallel to the approximation straight line 75a of the tooth 72. Next, the tooth 72 is cut in the same way as in Embodiment 1, as illustrated in FIG. 7 (S4). As a result of a first cutting, the tooth plane 75b coinciding with the approximation straight line 75a is formed. An explanation of step S6 will be omitted. Next, the computer 50 causes the gear 100 to rotate by an angle B2 (S7). The angle B2 will be explained below in further detail. The rotation axis A1 of the end mill 30 becomes disposed as a result parallel to an approximation straight line 76a of the tooth 72 (S8). The computer 50 moves the end mill 30 parallelly along a center axis A2 of the gear 100, to cut as a result the tooth 72 and form the tooth plane 76b that coincides with the approximation straight line 76a (S10).

The angle B2 is explained next. In FIG. 7 and FIG. 8, dashed lines L3 (L3a and L3b) denote radial-direction lines (hereafter, radial lines) that extend from the center axis A2 of the gear 100 to the tooth 72. The dashed line L3a denotes the position of the radial line during cutting of the tooth plane 75b (i.e. step S4). The dashed line L3b denotes a position of the radial line during the cutting of the tooth plane 76b (i.e. step S10). As can be leaned from FIG. 8, the rotation angle B2 is equal to an angle formed by the approximation straight line 75a and the approximation straight line 76a that are adjacent to each other (tooth plane 75b and tooth plane 76b after cutting). That is, in step S7, the computer 50 causes the gear 100 to rotate by an angle that corresponds to the angle B2 formed by the approximation straight line 75a and the approximation straight line 76a that are adjacent to each other.

After the cutting of the tooth plane 76b, the computer 50 repeats step S6 to step S10 if cutting is to be further repeated (YES in S12), i.e. if a tooth plane other than the tooth plane 75b and the tooth plane 76b is to be cut.

In Embodiment 2 as well, upon repetition of step S10, the orientation of the rotation axis A1 of the end mill 30 is kept identical to the orientation of the end mill 30 at a time of a previous cutting.

In the present embodiment, the maximum distance D between each approximation straight line and the curved line is managed so as not to be greater than the machining tolerance of the tooth planes. The tooth planes of the gear 100 can therefore be finished to within a predetermined precision by using the straight line-shaped end mill 30.

Preferred embodiments of the present invention have been described above. The features to remember in the embodiments are explained next. Machining in step S4 in the flowchart of FIG. 3 corresponds to the first cutting. Step S10 performed subsequent to step S4 corresponds to the second cutting. In a return loop from step S12 to step S6, machining in the preceding step S10 can be regarded as corresponding to the first cutting, and machining in step S10, performed again upon loop-back, can be regarded as corresponding to the second cutting.

Machining in step S6 of FIG. 3 may be performed by an operator, instead of a computer. Alternatively, if progression of wear is slow, machining in step S6 may be performed once every predetermined number of times that there is repeated a return loop from step S12 to step S4.

In the Embodiment 1, an example has been explained that involved cutting the tooth planes of the outer punch, which are entirely flat. In the Embodiment 1, the first tooth plane is cut, and the second tooth plane, adjacent to the first tooth plane, is cut thereafter. Alternatively, the cutting of the first tooth plane may be followed by cutting of another tooth plane that is not adjacent to the first tooth plane. Specifically, the outer punch may be rotated by an integer multiple of tooth pitch, in step S7 of the flowchart of FIG. 3.

In the above embodiments, the orientation of the rotation axis A1 of the end mill is maintained in the vertical direction, but the direction is not particularly limited thereto, and the orientation may be maintained in an arbitrary direction, for instance a horizontal direction.

In Embodiment 2, the plurality of approximation flat tooth planes, which is approximations of the curved tooth plane, is cut over multiple stages. Upon machining the second tooth plane, specifically, part of the tooth plane that is cut in the first cutting is cut, by the peripheral cutting edges of the end mill 30, while the orientation of the end mill 30 is maintained identical to the orientation of the end mill 30 upon machining the first tooth plane. In the case of gear cutting such that the curved tooth plane is approximated in the form of the plurality of flat tooth planes, a flat tooth plane may be cut on the basis of one approximation straight line of one tooth, after which a flat tooth plane is cut on the basis of one approximation straight line of another tooth. In a case where a curved tooth plane of one tooth can be approximated to a first approximation straight line and a second approximation straight line in a cross-sectional surface, a flat tooth plane that corresponds to the first approximation straight line may be sequentially processed for a plurality of teeth, as in the Embodiment 1, and, thereafter, a flat tooth plane corresponding to the second approximation straight line is subsequently processed for each tooth.

An example of cutting the tooth planes of the spur gear has been explained in the Embodiment 2, but the present invention can be used also in helical gears where tooth planes trace a helix about the gear axis. In such a case, the gear may be rotated slowly along the center axis of the gear while the end mill is translationally moved parallelly to the center axis of the gear. In this case as well, the orientation of the center axis of the end mill is kept constant.

In all the instances explained above, the orientation of the rotation axis of the end mill is maintained at all times during repeated cutting of the tooth planes. It should be noted herein that the orientation of the end mill during cutting of a current tooth plane is kept identical to the orientation of the end mill during cutting of a previous different tooth plane. That is, the end mill performs simply a translational movement along a same straight line, at all times, upon repeated machining of the tooth planes. Resorting to such a configuration allows simplifying considerably the NC data that defines the trajectory of the end mill. It should likewise be noted that the end mill may be moved arbitrarily between cutting and cutting.

Embodiments of the present invention are described in detail above, but the embodiments are merely exemplary in nature, and are not meant to limit the scope of the claims in any way. The technical features set forth in the claims encompass various alterations and modifications of the specific instances that are described above by way of example. The technical elements set forth in the description and drawings afford technical usefulness, independently from each other or in various combinations, and are not limited to the combinations set forth in the claims at the time of filing. While the technical features set forth in the description and drawings may achieve a plurality of objects simultaneously, technical usefulness is afforded through achievement of a single one of such objects.

What is claimed is:

1. A method for machining a tooth surface of a toothed member, the toothed member having a cylindrical portion with teeth extending from the cylindrical portion, and the tooth surface being formed on a periphery of one of the teeth of the toothed member and extending in a direction of a center axis of the toothed member, the method comprising:

providing a machine tool configured to rotate an end mill about a longitudinal axis thereof, the machine tool being configured to move the end mill along two linear axes of a three-axis Cartesian axis system, the machine tool also including a rotation mechanism and a tailstock between which the toothed member is clamped so as to be rotated by the rotation mechanism and linearly moved along the third Cartesian axis, the machine tool not being configured to provide any further relative movements between the end mill and the toothed member beyond the rotation of the end mill, the rotation of the toothed member, and the linear movements along the three Cartesian axes, approximating a curve line with a series of straight lines, the curve line being a design shape of the tooth surface in a cross-sectional plane transverse to and intersecting with the center axis of the toothed member, the approximating being performed so that a maximum distance among distances between respective ones of the straight lines included in the series of straight lines and the curve line is less than a machining tolerance of the tooth surface, first cutting of one of the straight lines of the tooth surface by only using a peripheral cutting edge of an end mill while keeping the rotation axis of the end mill at an orientation parallel to said one straight line among the straight lines and moving the toothed member parallel to the center axis of the toothed member, rotating the toothed member around the center axis of the toothed member via the rotation mechanism so that the orientation of the rotation axis of the end mill becomes parallel to another straight line among the straight lines included in the series of straight lines, and second cutting of said another straight line of the tooth surface by only using the peripheral cutting edge of the end mill while keeping the rotation axis of the end mill at the same orientation as that in the first cutting and parallel to the another straight line among the straight lines included in the series of straight lines and moving the toothed member parallel to the center axis of the toothed member.

2. The method of claim 1, wherein, the approximating is performed so that respective straight lines are each shorter than a length of the peripheral cutting edge of the end mill.

* * * * *